United States Patent [19]

Misgen et al.

[11] Patent Number: 4,834,885

[45] Date of Patent: May 30, 1989

[54] SEAL ARRANGEMENT FOR FLUID FILTERS

[75] Inventors: Kenneth G. Misgen, Burnsville; Gary R. Gillingham, Prior Lake; Gary J. Rocklitz, Burnsville; Reynold F. Durre, Eden Prairie, all of Minn.

[73] Assignee: Donaldson Company, Inc., Minneapolis, Minn.

[21] Appl. No.: 4,350

[22] Filed: Jan. 16, 1987

[51] Int. Cl.[4] .............................................. B01D 27/08
[52] U.S. Cl. .................................... 210/440; 210/443; 210/416.4; 210/416.5; 210/450; 210/452
[58] Field of Search .................. 210/168, 416.4, 416.5, 210/440, 443, 450, 452, DIG. 12, DIG. 13, 444

[56] References Cited

U.S. PATENT DOCUMENTS

| | | | |
|---|---|---|---|
| 2,333,890 | 11/1943 | Russell | 210/440 |
| 3,067,880 | 12/1962 | Bowers et al. | 210/444 |
| 3,069,015 | 12/1962 | Hultgren et al. | 210/DIG. 17 |
| 3,200,953 | 8/1965 | Komarmy | 210/DIG. 17 |
| 3,333,703 | 8/1967 | Scavuzzo et al. | 210/DIG. 17 |
| 3,485,380 | 12/1969 | Offer et al. | 210/249 |
| 3,685,658 | 8/1972 | Baldwin | 210/440 |
| 4,051,036 | 9/1977 | Conrad et al. | 210/DIG. 17 |
| 4,369,113 | 1/1983 | Stifelman | 210/440 |

FOREIGN PATENT DOCUMENTS

| | | | |
|---|---|---|---|
| 1382477 | 11/1964 | France | 210/443 |
| 82/01580 | 5/1983 | PCT Int'l Appl. | |
| 2100140 | 12/1982 | United Kingdom | |

*Primary Examiner*—Benoit Castel
*Attorney, Agent, or Firm*—Merchant, Gould, Smith, Edell, Welter, & Schmidt

[57] ABSTRACT

A filter arrangement is provided which includes preferred fluid sealing between a top plate thereof and a housing. Generally, the filter arrangement includes a housing, a top plate and an internal filter. The top plate encloses an end of the housing, retaining the filter therein and directing fluid flow appropriately across the filter. Engagement between the housing and the top plate is such that a gasket may be used to provide sealing of an operable combination of the filter arrangement with an associated filter head, with respect to flow space between the housing and top plate by means of a simple gasket position externally of the filter arrangement. Several embodiments have shown, and in at least one the housing edge terminates in a groove in the top plate, in which a sealing gasket may be positioned. Positive engagement between the top plate and the housing is provided by a variety of projection arrangements. Secure seating of a gasket with an assembly may be provided by a gasket-receiving groove in the top plate, by a pinch fold, or by a bracket attached to the housing.

8 Claims, 6 Drawing Sheets

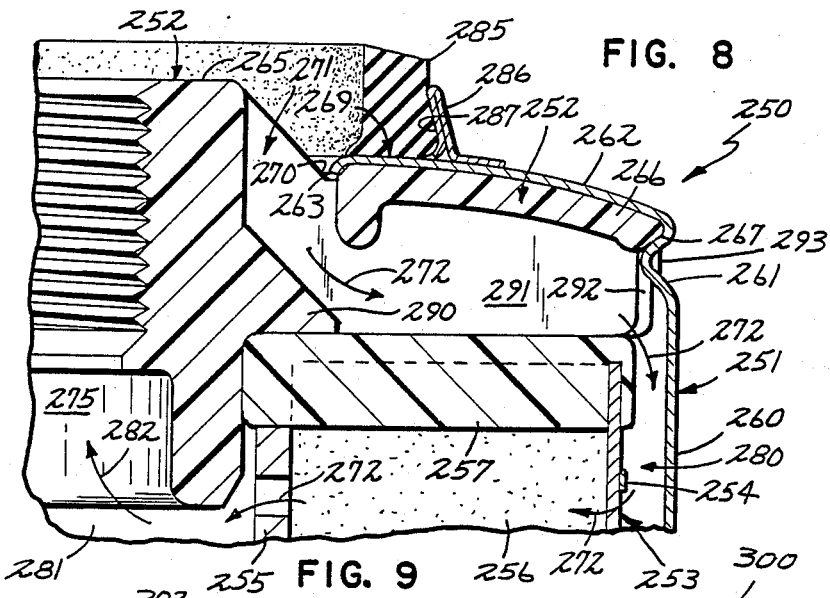
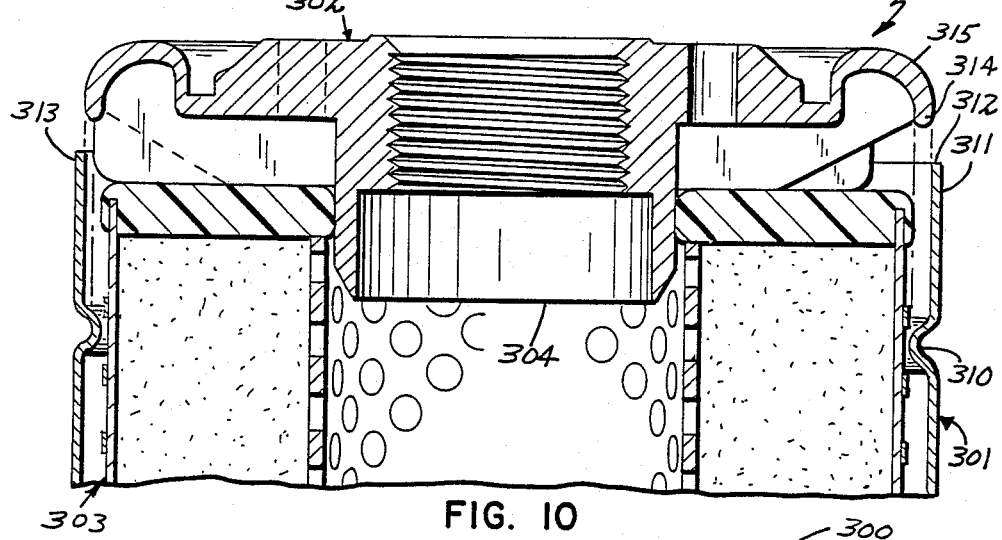
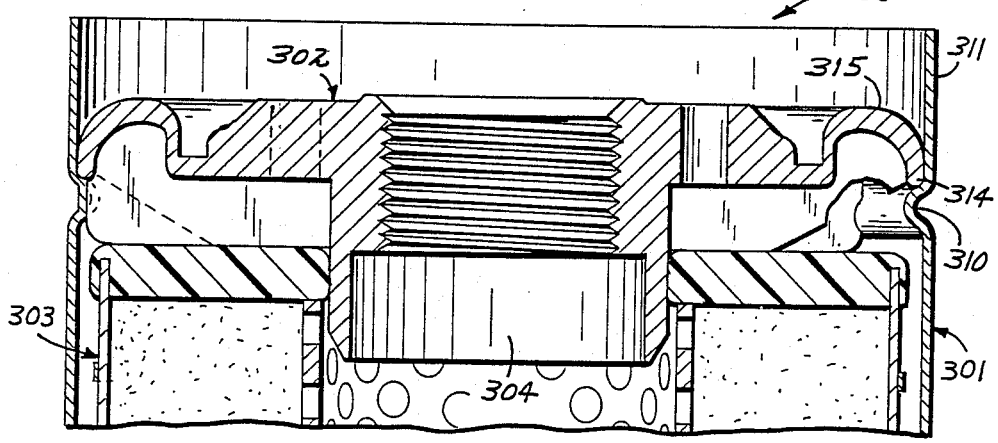

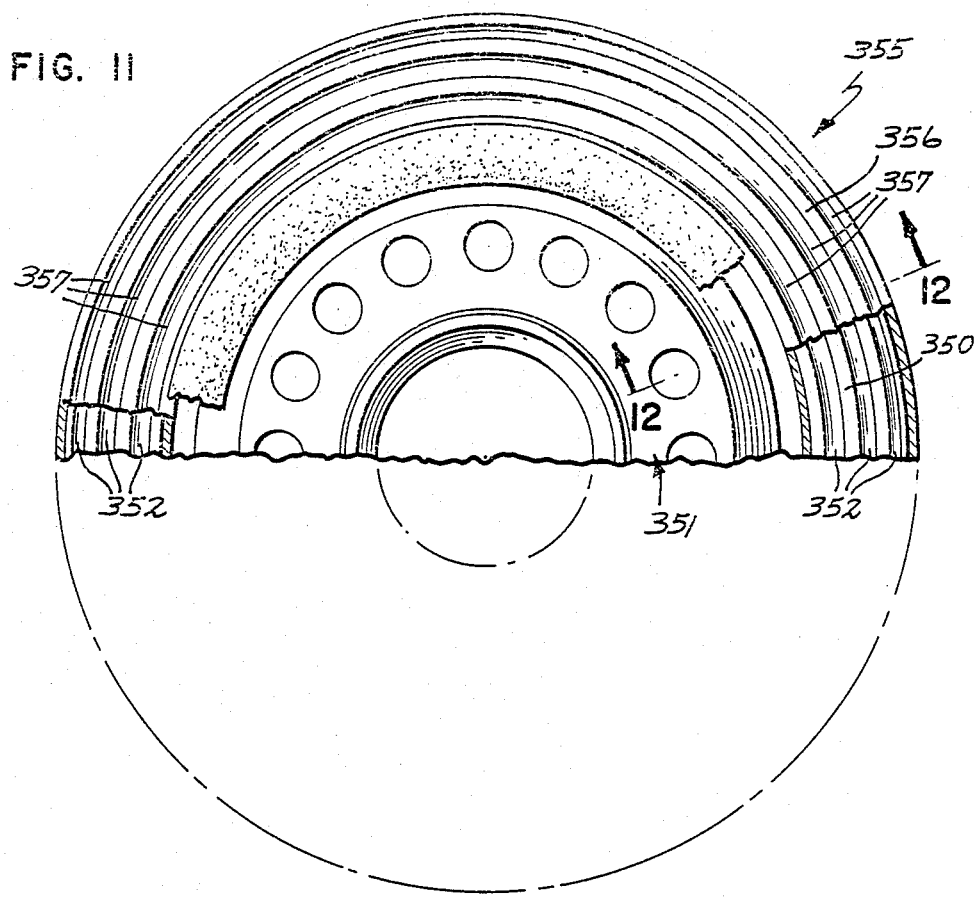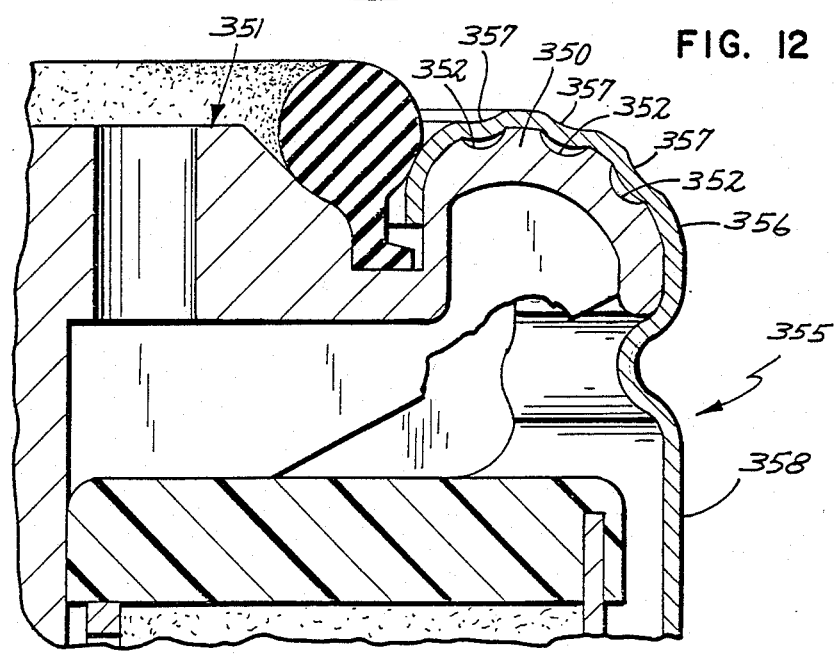

SEAL ARRANGEMENT FOR FLUID FILTERS

TECHNICAL FIELD

The present invention relates generally to fluid filters and particularly to fluid filters of the spin-on type. More particularly, the invention relates to spin-on filters incorporating a rigid, unitary, cover; the cover being secured to a filter housing by means of a folded portion of the housing.

BACKGROUND ART

Spin-on filters have been employed in a variety of applications including hydraulic systems, fuel systems and lubrication systems. Such filters generally include a filter element positioned within a can, casing or housing having a cover or top plate at one end thereof, by which the filter can be mounted on a filter head. A central opening and several surrounding openings in the cover are usually provided to direct flow through the filter and filter element therein, which flow can be in either an inside/out or an outside/in pattern. A circular gasket on the outside of the cover serves as an external seal between the filter and the filter head. A second circular gasket on the inside of the cover functions as an internal seal between portions of the filter element and the cover. Spin-on filters are typically intended to be used only once, with removal and replacement.

In the past, two conventional arrangements have generally been used to provide for sealing engagement with respect to fluid flow outwardly from between the cover or top plate and the casing. An example of one of these types of conventional arrangements is shown in U.S. Pat. No. 4,369,113, the specification of which is incorporated herein by reference. For the arrangement disclosed in that patent, the cover (28) includes an outer rim or edge with an O-ring receiving groove therein. A circumferential O-ring (42) is positioned between the cover (48) and the housing (12) to provide the seal. Thus, the arrangement uses a positive seal positioned between the two assembly members which comprise the cover (28) and the housing (12).

Such an arrangement, while effective, is not completely satisfactory for all applications. First, a relatively thick and strong material may be necessary for the formation of the casing, since the casing should not be permitted to substantially deform in the area of the circumferential O-ring (42) or leaking may result. Such deformation, from metal fatigue for example, could follow a multi-pulse occurrence of relatively high fluid pressures within the filter assembly. Further, the arrangement of '113 generally requires a folded connection (47) in the top portion of the housing, which may be relatively expensive to prepare. Also, the arrangement provides for two possible locations of fluid leak, one around the seal provided by the O-ring (42) and a second around the seal provided by gasket (44) positioned between the cover plate (28) and the filter head. Two possible positions of leakage are almost inherently worse than one, and at least usually require more examination during use and care during assembly. Further, such an arrangement generally requires construction of the top plate or cover (28) from non-porous materials so that leaking through the material itself does not occur.

A second conventional method of providing sealing engagement with respect to flow from between a top plate and a housing or casing is illustrated in FIG. 1 herein. Referring to FIG. 1, reference numeral 1 generally designates a conventional filter assembly. The filter assembly 1 includes an outer casing 2 having an end 3, in which is received the cover, end plate or top plate 4. Details concerning the filter assembly 1 will not be described here, however generally the top plate 4 includes first and second flow means, or apertures 5 and 6, providing means for directing fluid flow into and out of the filter assembly 1. Generally, in use the filter assembly 1 is attached to a conventional filter head, (not shown) with gasket 7 providing for sealing engagement therebetween.

The flow seal for the casing 2 with respect to flow between the casing 2 and the top plate 4 is generally indicated by reference numeral 10. The particular seal 10 shown is a conventional roll type seal or seam 11. Such a seal is formed by welding or otherwise attaching plate 12 to an upper surface of the top plate 4. Plate 12 includes an extension 13 which may be rolled with an upper lip 14 of the casing 2, to form the seal 11.

Such a conventional roll-type seal may be undesirable for numerous reasons. For example, such a seal may work itself loose, and leak, under filter asembly use conditions, for example when numerous pulses of fluid under pressure flow through the assembly. Further, such an arrangement generally provides for two locations of potential leaking; one by means of flow passage through the roll seal 11 itself; and, a second being around the gasket 7 whereat the filter head, not shown, is engaged. Also, a roll-type seal may result in a substantial weakening of the casing material, as the multiple folds are formed. Thus, in some instances a relatively thick and strong casing material may have to be chosen, to help deter the roll-type seal from working itself loose. This may add cost or create special assembly needs. Further, top plates utilized in association with such roll seams must be of substantially rigid construction since the roll seams can loosen and leak under multiple pressure pulsations, if the top plate is flexible.

Another potential problem with such an arrangement is that generally the material chosen for the top plate should be such as to provide for a ready attachment of the plate 12 used to form the roll seal 11. Typically, plate 12, being steel, will be attached by spot welding, so the top plate 4 should be of a material, typically also steel, permitting such spot welding. This can lead to relatively expensive or corrosion prone components for the conventional filter assembly. Spot welding aay also result in contaminating fumes during construction.

A problem addressed by some conventional filter assemblies is that of providing lock means preventing the casing or housing from being rotated independently of the cover or end plate. Generally, a filter assembly is mounted for use by being spun onto a mount of a filter head or the like. Secure attachment is provided by threaded engagement between the top cover and the filter head. As the assembly is spun, unless a good tight engagement between the top cover and the casing is provided, the casing and cover may loosen and slip with respect to one another. One solution to this problem was suggested in U.S. Pat. No. 4,369,113 and relates to the utilization of projections on the top cover which are received in pre-formed indentations located in the housing. When the top cover is mated with the housing during assembly, generally the projections on the top cover are aligned with the indentations in the housing, before the insertion. Thus, assembly of an arrangement such as that shown in '113 may require a step of aligning the cover plate projections with the housing indentations, a potentially time consuming operation. Generally, it would be preferred to utilize an arrangement and method of assembly which could avoid this step and the costs associated therewith. Further, the arrangement of '113 generally requires expansion of the casing at an end thereof. This leads to a workhardening of the steel casing at this point, which makes folding of the metal, to retain the top plate, somewhat more difficult and potentially more expensive.

OBJECTS OF THE INVENTION

Therefore the objects of the present invention are: to provide a filter assembly arrangement facilitating engagement between a cover member and a housing member of such an assembly; to provide such an arrangement wherein sealing with respect to undesired fluid flow outwardly from between the cover member and the housing may be accomplished by gasket means or a gasket exterior to the assembly and used in association therewith; to provide such an arrangement including means for retaining an associated gasket in position; to provide such an arrangement including means facilitating appropriately orienting the cover member relative to the housing during assembly; to provide such an arrangement enabling the cover member to be produced from a material such as a synthetic polymer or the like and/or from a material different from the housing to provide such an arrangement including means substantially inhibiting rotational movement of the cover member relative to the housing, in the absence of pre-formed projection-receiving indentations in a portion of the housing; to provide such an arrangement facilitating the use of relatively thin material for the housing; to provide a method of assembling such an arrangement; to provide such a method which is relatively easy to effect; and to provide such an arrangement which is relatively simple to manufacture, is relatively inexpensive to produce, lends itself to high speed manufacture and which is particularly well adapted for the proposed uses thereof. It is also an object of this invention to provide an operative combination of a filter head, a gasket and a filter assembly, as above described.

Other objects and advantages of this invention will become apparent from the following descriptions, taken in connection with the accompanying drawings wherein are set forth by way of illustration and example certain embodiments of this invention.

SUMMARY OF THE INVENTION

A filter assembly or arrangement is provided for the filtering of fluids. The preferred embodiment described and shown is particularly adapted for use as a fuel filter or an oil filter for motor vehicle engines. However, the general principles of the invention may be applied to numerous systems including hydraulic fluid filters.

The invention particularly concerns spin-on type filters wherein a filter mechanism is generally reciived within an outer housing or casing. The filter mechanism typically includes a cover or end plate, which is received within an end of the housing, usually the top end; the housing otherwise being an enclosed receptacle. The end plate, or top plate, generally includes fluid flow directing means therein directing fluid into an appropriate part of the filter assembly, across a filter element, and outwardly from the assembly, as desired. Generally, this is provided by a plurality of spaced, annularly located, channels which permit fluid flow into the filter assembly; and by a central bore, which permits fluid to flow outwardly.

In a typical arrangement, the central bore is threaded for engagement with a filter head in a conventional manner. Sealing engagement with an associated filter head is typically provided by an annular gasket positioned between the top plate and the filter head. Such arrangements will generally be referred to herein as "spin-on" filters.

The present invention generally relates to means for mounting the cover, end plate, or top plate within the filter assembly, and specifically to the engagement between the housing or casing and the top plate. It is a goal of the invention to facilitate engagement between the top plate and the housing, by providing an arrangement permitting use in a gasket-type member positioned between the assembly and an associated filter head to inhibit undesired flow of fluid leaking from between the housing and the top plate to the exterior environment. Thus, no positive seal is provided between the top plate and the housing. Rather, flow therebetween is rendered harmless by directing same into an area controlled by the gasket.

The invention also generally relates to the provision of an operable engagement between a top plate and a housing attainable through the use of relatively thin material for the housing and, if desired, through the use of a top plate molded from a synthetic polymeric material or the like.

According to the present invention, the housing or casing is provided with an inner bead, against which the top plate may seat when the arrangement is assembled. For the preferred embodiment, the housing is generally cylindrical, with an enclosed end and an open end. However, non-circular top plates and housings may be used in accordance with the principles of this invention. Such non-circular top plates are, due to their shape, inherently less likely to rotate with respect to the housing. Preferably, the bead comprises an annular inward projection positioned in the housing at a selected location spaced from the open end. The bead or bead means may be continuous, or be composed of special sections, and still operate in accordance with the principles of this invention. Generally, the distance between the bead and the open end of the housing is sufficiently great to generate a cover portion, or cover lip, in the housing of appropriate size for folding along and over the top plate or cover in a manner as described herein, to apply the principles of the present invention.

The top plate or cover includes an upper or outer surface. When the arrangement is assembled, the top plate generally abuts the housing with the upper surface facing outward through the housing open end. The cover upper surface includes a gasket-receiving portion thereon, over which the gasket means may rest when the filter assembly is used, generally with a portion of the housing being between the gasket-receiving portion of the top plate and the gasket. In an arrangement according to the present invention, during assembly the housing cover portion is folded over the top plate, to form a top portion with a housing upper edge that terminates, against the cover plate, in the vicinity of the gasket-receiving area. When this occurs, as gasket means are positioned in the gasket-receiving area and are compressed between the top plate and an associated filter head, for example during normal operation of the filter assembly, a fluid tight seal will be provided with respect to fluid flow outwardly from between the top plate and the housing. Specifically, due to the relative positioning of the gasket with respect to the upper edge of the cover portion, flow from between the housing and the top plate is contained by the gasket and does not flow outwardly from the operative combination of the filter assembly, the gasket and the filter head. This arrangement generally avoids the utilization of a secondary seal such as a circumferential O-ring around the top plate, or an assembly utilizing a roll seam around the upper end of the casing or housing.

Numerous arrangements utilizing the above principles are shown in the drawings. In a preferred form, the gasket-receiving area comprises an annular groove positioned in an upper surface of the top plate. The groove may be used to receive the edge of the housing, during folding, and further is used to receive the gasket means or gasket during operation of the assembly. Such a groove, then, may also generally comprise a gasket-retaining means for holding a selected gasket in position.

As will be seen from the detailed description, substantial portions of the upper surface of the top plate are enclosed within the housing. In fact, for the preferred arrangement at least all portions of the top plate outside of the region enclosed by the gasket are so enclosed. As a result, it is not necessary that the top plate be completely impermeable to fluid. That is, it may be formed from a material, which may permit the flow of fluid through certain parts thereof. Such an arrangement is made possible because should there be fluid flow through these portions of the top plate, the flow will merely engage the housing and would be prevented by the gasket from leaking outwardly from the operative combination of the filter assembly, the gasket and the filter head. In fact, even large holes in this part of the top plate pose no problem.

Further, such an arrangement avoids the need for spot welding any parts directly onto the top plate. As a result, the top plate may be manufactured from matrials not readily useable for spot welding, as for example certain synthetic polymers. Further, even if metal top plates are used, expense and problems associated with welding are avoided. Also, since a roll seam is avoided, the top plate may have arelatively thin and flexible construction. That is, it may flex somewhat under repeated pressure pulses without substantial leaking.

Since a roll-type seal, or an O-ring type seal, around the outer periphery of the top plate is avoided, the housing may be constructed from a relatively thin metal, such as steel or the like. That is, relatively thick pieces of metal may be avoided if desired. Generally, the limits on the thickness of the materials which may be used relate to expected pressure limits for fluid flowing through the filter assembly. As will be seen, by comparison to conventional arrangements, the invention allows an optimized hydrostatic housing design in the area of the cover portion, which allows for a reduced metal thickness to operatively resist pressure. Thus, in part as a result of the inventive design described herein, thickness limitations do not necessarily stem directly from design limits imposed by the selected engagement between the top plate and the casing.

An advantage to the bead construction previously described is that it may lead to strengthening of the housing in the area of the cover portion with respect to radial expansion. That is, the bead may generally inhibit radial flexing of the housing in the area of the cover portion, when that part of the housing is under multiple pressure pulses from fluid flow. As a result, the metal in the area of the cover portion may be less subject to fatigue, potentially leading to longer life without substantial leaking and with a thinner metal.

Another advantage to the bead is that it provides a useful stop for locating the top plate, during assembly. That is, the top plate, with filter means attached thereto, may be dropped or pressed into the housing until the top plate seats against the bead; the bead being positioned at an appropriate desired depth to support the top plate and filter means.

According to the present invention, means may be readily introduced to generally inhibit rotational movement of the housing independently of, and relative to, the top plate. The various embodiments disclosed show numerous alternatives for accomplishing this. For several of them projection members or projections are located on the top plate, around its outer periphery. When the top plate is seated against the bead, generally the projections either extend into the bead itself or into the cover portion of the outer housing. As the cover portion of the housing is wrapped over the top plate, the housing can fold around the projections, engaging same. This engagement will generally inhibit undesired relative movement between the top plate and the housing.

As an alternative, projections may be provided in the top plate upper surface, as for example in an annular groove therein. When the cover portion is folded to extend into the annular groove, the cover portion can wrap around these projections, providing the desired engagement.

It will be understood that either of the engagements above described can be accomplished without a pre-formation of indentations within the housing. As a result, radial alignment of the top plate with respect to the housing is not a critical step of assembly. Further, relatively thin material may, again, be used for the housing.

The area of the preferred assembly that engages associated gaskets during use is generally free from projections of the like that may positively engage the gasket with respect to sliding movement thereof. Thus, the gasket is generally free to circularly slide within the gasket-receiving area; a result advantageous in providing good mounting with secure sealing and without substantial undesired damage to the gasket.

A modification of the invention is shown wherein the top plate includes one or more circular grooves therein, over which the housing cover portion may fold during assembly, forming corrugations therein. The corrugations aid in securing the top plate within the housing.

The drawings constitute a part of this specification and include exemplary embodiments of the present invention, while illustrating various objects and features thereof. In some instances relative material thicknesses may be shown exaggerated, to assist in an understanding of the invention.

BRIEF DESCRIPTION OF THE DRAWINGS

FIG. 8 is an enlarged fragmentary cross-sectional view of a filter assembly incorporating a third alternate embodiment of the present invention; FIG. 8 being a cross section taken generally from an analogous orientation to that used for FIG. 5.

FIG. 9 is a fragmentary cross-sectional view of a filter assembly according to the present invention shown during a step of assembly; the oriettation of FIG. 9 being generally analogous to that of FIG. 3.

FIG. 10 comprises fragmentary cross-sectional view taken generally from an orientation analogous to that used for FIGS. 3 and 9, and showing a filter assembly according to the present invention during a stage of partial assembly; the stage of FIG. 10 being after that of FIG. 9 and before that of FIG. 3.

FIG. 11 is an enlarged, fragmentary top plan view of a modified assembly taken generally from a point of view analogous to that used for FIG. 2.

FIG. 12 is an enlarged, fragmentary, cross-sectional view taken generally along line 12—12, FIG. 11; i.e., from an orientation analogous to that used for FIGS. 3, 9 and 10, but showing a modified form of the invention.

DETAILED DESCRIPTIONS OF THE PREFERRED AND ALTERNATE EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriate detailed structure.

Figure 1:
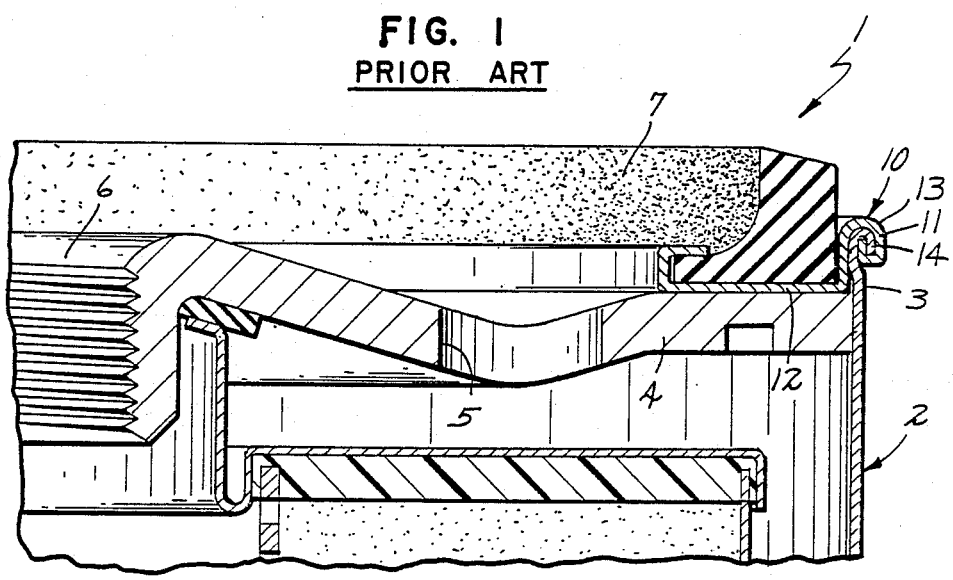
FIG. 1 is a fragmentary cross-sectional view of a prior art filter assembly including a cover plate mounted in a housing.
Figure 2:
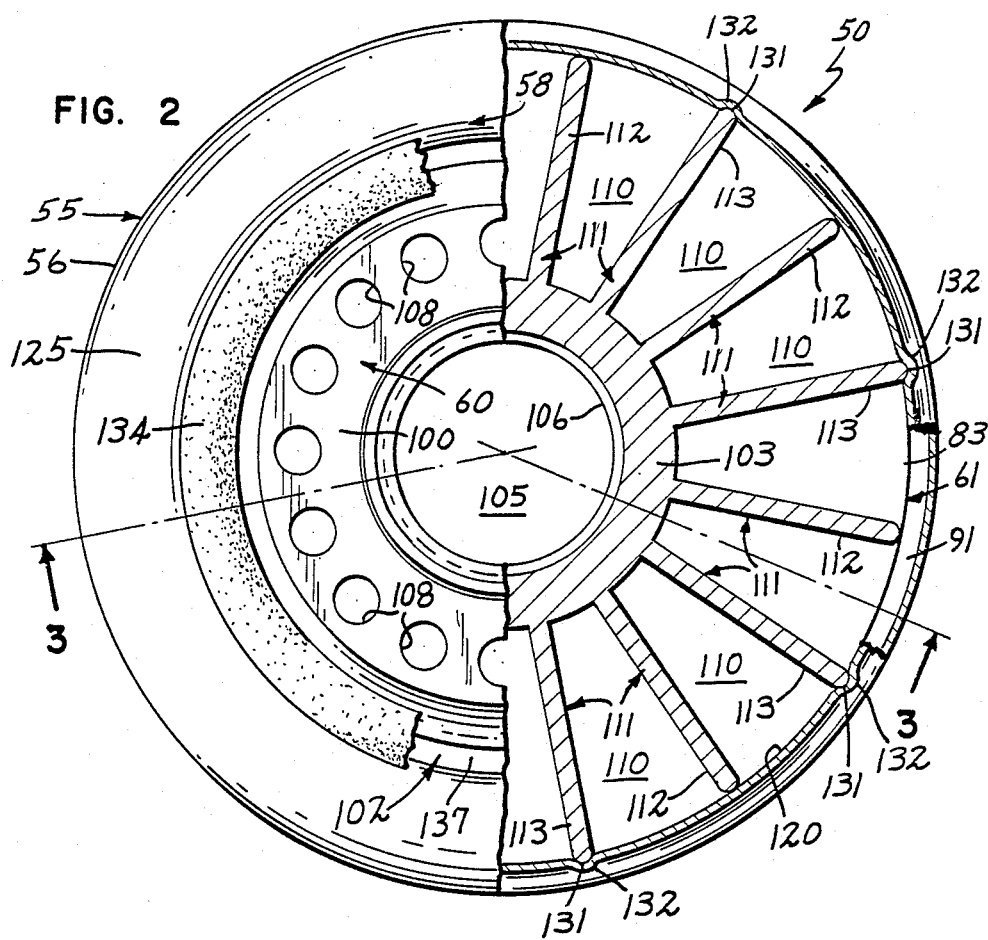
FIG. 2 comprises a top-plan view of a filter assembly according to the present invention, with portions broken away to show internal detail.
Figure 3:
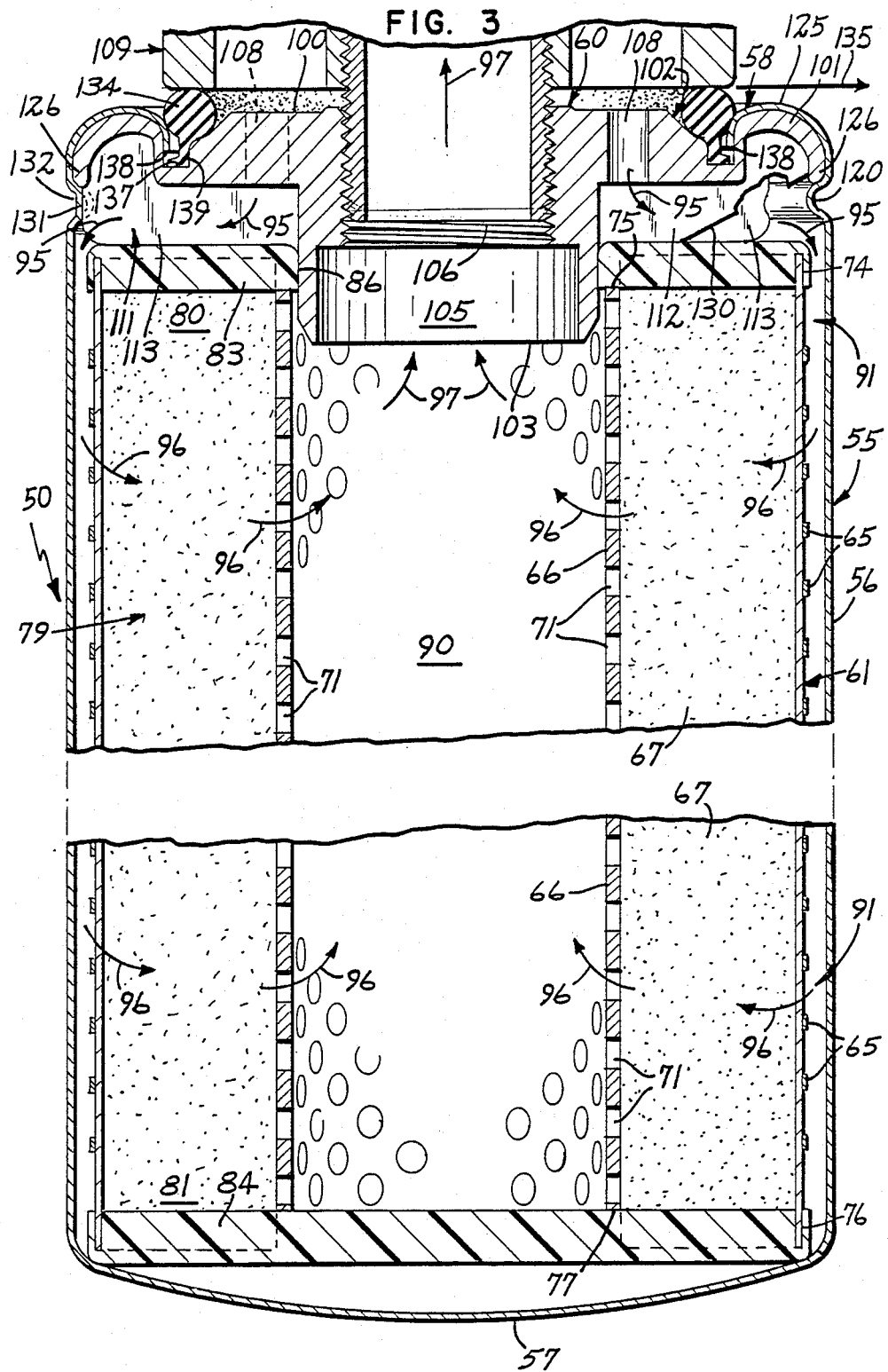
FIG. 3 comprises the fragmentary cross-sectional view taken generally along line 3—3 of FIG. 2, and with certain portions broken away to show detail and with an associated filter head depicted in fragmentary cross-section.
Figure 4:
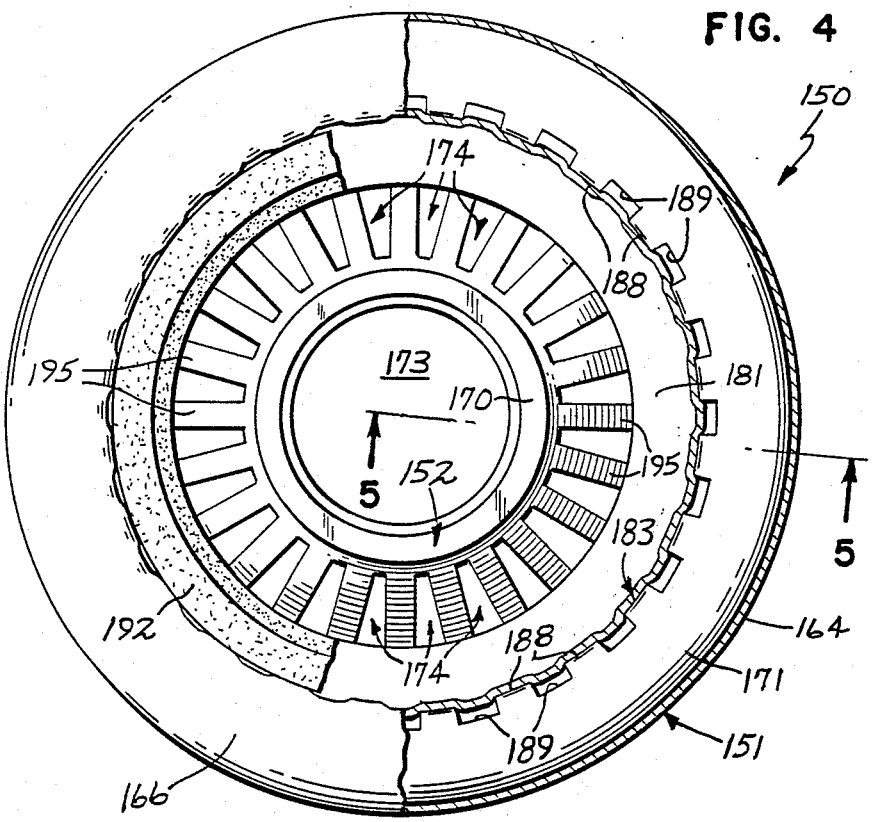
FIG. 4 comprises the top-plan view of a filter assembly comprising a first alternate embodiment of the present invention with certain portions broken away to show detail.
Figure 5:
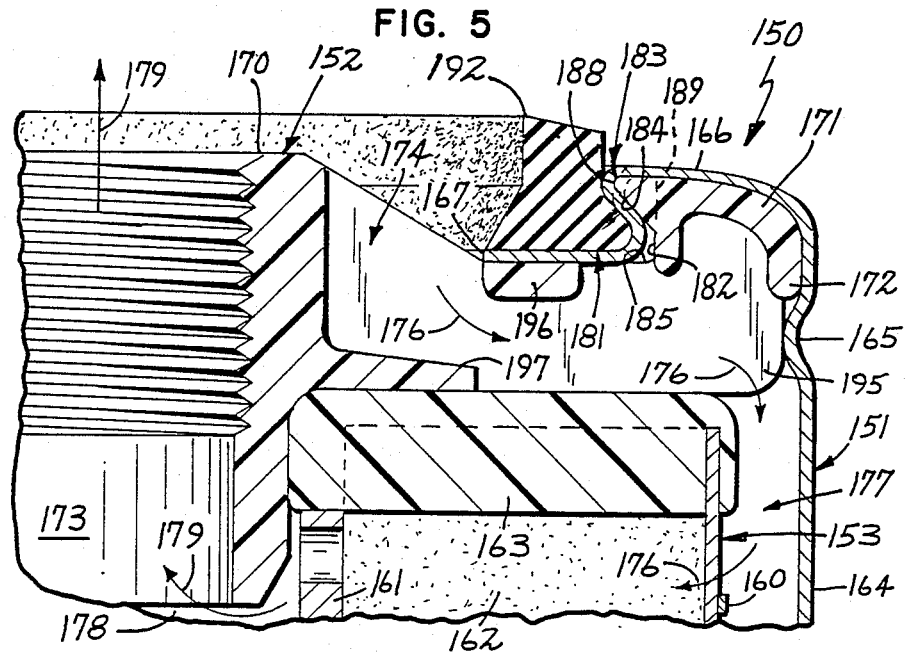
FIG. 5 comprises an enlarged, fragmentary cross-sectional view taken generally along line 5—5 of FIG. 4.
Figure 6:
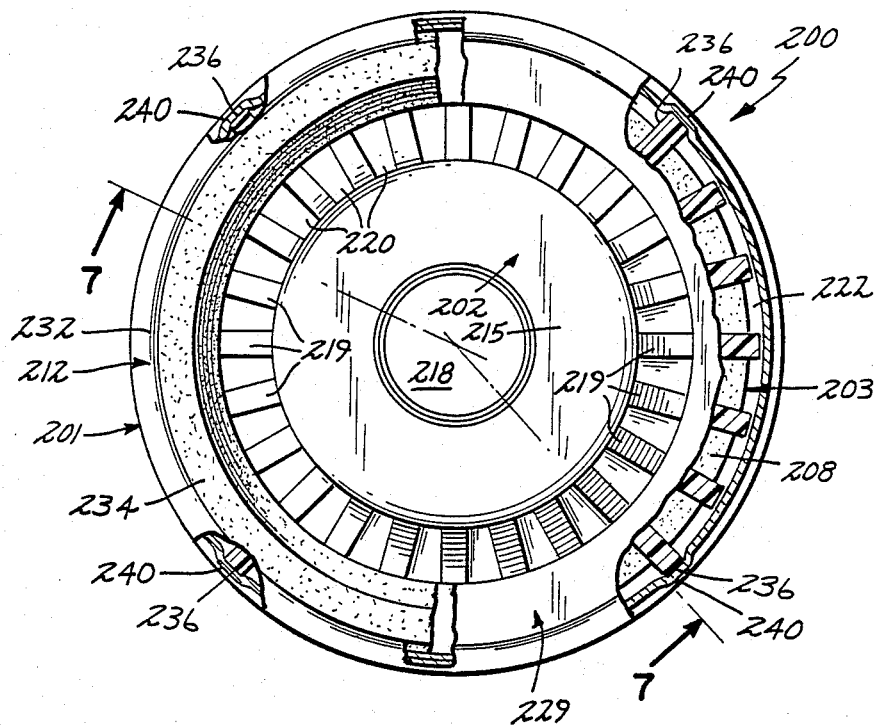
FIG. 6 is a top-plan view of a filter assembly incorporating a second alternate embodiment of the present invention and with portions broken away to show detail.
Figure 7:
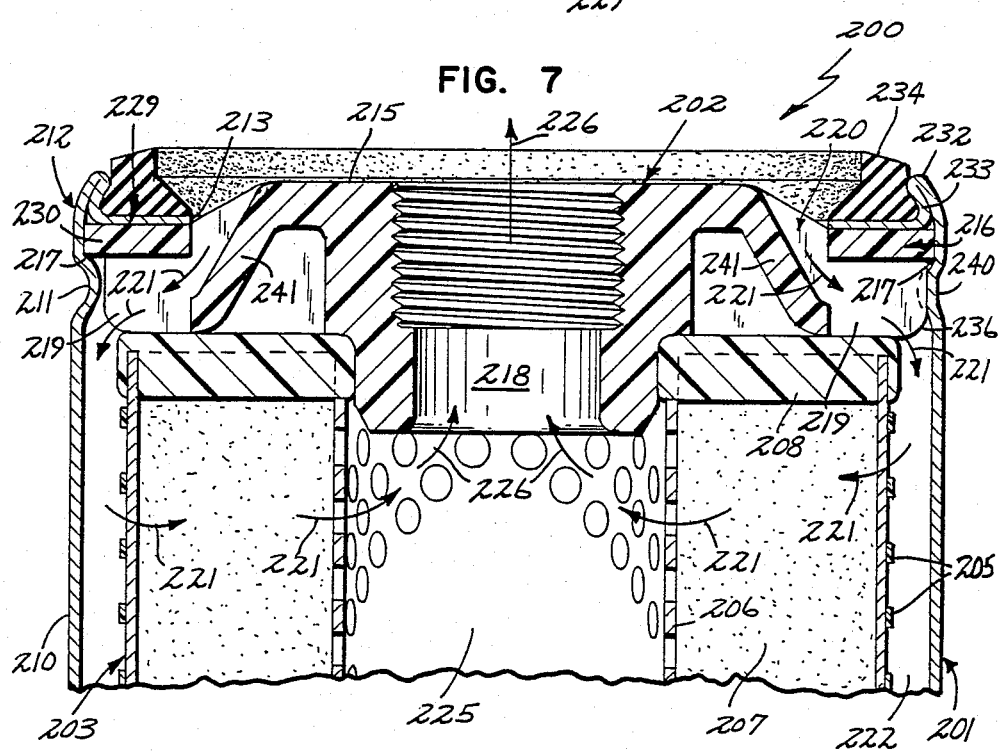
FIG. 7 is an enlarged fragmentary cross-sectional view of the embodiment shown in FIG. 6, taken generally along line 7—7 thereof.

The reference numeral 50, FIG. 2, generally designates a filter assembly or filter arrangement according to the present invention. FIGS. 2 and 3 depict a first embodiment of a preferred filter assembly according to the present invention. FIGS. 4 and 5 depict a first alternate embodiment; FIGS. 6 and 7 a second alternate embodiment; FIG. 8 a third alternate embodiment; FIGS. 9 and 10 depict stages or steps for the assembly of the arrangement shown in FIGS. 2 and 3; and FIGS. 11 and 12 depict a modification to the arrangement shown in FIGS. 2 and 3.

Referring to FIG. 3, the filter assembly or arrangement 50 comprises a housing 55 having a sidewall 56, a closed end 57, and an open end 58. The housing 55 depicted comprises a can of unitary construction or structure.

The filter assembly 50 includes a plate or cover 60 enclosing a filter 61 within the housing 55. The filter 61 may be of any of a conventional constructions, such as for example that described in U.S. Pat. No. 4,369,113. Generally, the filter 61 includes an outer edge defined by ribs 65, an inner sidewall 66 and a filter element 67, typically a fluted filter, positioned between the ribs 65 and the sidewall 66. In typical operation of the arrangement 50 shown in FIG. 3, fluid flows from the outer edge and ribs 65 through the filter element 67 to the inner sidewall 66. It is noted that an opposite flow of fluid being filtered can be accommodated by filter arrangements utilizing the principles of this invention.

The filter element 67 is sufficiently porous to allow flow therethrough. The inner sidewall 66 is provided with a plurality of flow apertures 71, to permit fluid flow completely through the filter 61.

For the embodiment of FIGS. 2 and 3, the housing sidewall 56 is generally cylindrical, and is of circular cross-section, as are the filter outer ribs 65 and inner sidewall 66.

The ribs and inner sidewall, 65 and 66 respectively, define upper ends 74 and 75, and lower ends 76 and 77 of the edges of the filter 61. The ribs and inner sidewall, 65 and 66, define an annular space 79 therebetween, across which the filter element 67 extends. The annular space 79 has an upper end 80 and a lower end 81. The upper end 80 is enclosed by end cap or gasket 83, whereas the lower end 81 is enclosed by gasket 84. Gasket 83 includes a central bore 86 therein, which provides flow communication to an interior cylindrical chamber 90 defned by inner sidewall 66. Gasket 84, on the other hand, includes no such bore. Thus, for the embodiments shown, chamber 90 is enclosed at one end and open at the other.

It is noted that the terms "top" and "bottom" as used herein refer generally to an assembly 50 orientated as shown in FIG. 3. The term "bottom end" generally means that end 57 of the filter assembly which is completely enclosed by the housing 55, whereas the term "top end" refers to that end which is open and which is adapted for engagement with a filter head or the like. The terms "top" and "bottom" are not to be understood as otherwise limiting, but rather as generally indicating opposite ends of a device oriented for typical operation, and the terms are generally interchangeable with "open end" and "closed end", respectively.

The filter edge defined by the rib 65, and the housing sidewall 56 are sized, in diameter, relative to one another to define an annular channel 91 therebetween. For the embodiment shown in FIG. 3, during a typical operation of the assembly 50, flow of fluid to be filtered into the assembly 50 occurs generally along the path desigaated by arrows 95, that is first into the open end or top end 58 of the housing 55 and then into the annular channel 91. The fluid then flows across filter element 67, and into chamber 90, along the general flow paths indicated by arrows 96. Filtered fluid then flows outwardly from the assembly 50 along the general paths indicated by arrows 97.

The top or open end 58 of the housing 55, as indicated above, is generally enclosed by top plate 60. The preferred top plate 60 includes flow directing means therein, providing for a directed fluid flow into annular chamber 91, and outward from chamber 90. Generally the top plate 60 may be of any of a numerous designs, wherein means are provided separating inward and outward flow, to prevent mixing of unfiltered and filtered fluids. The top plate 60, of FIGS. 2 and 3, includes an end or upper surface 100, an outer peripheral portion 101, a gasket-receiving or seating area 102, and a central extension 103. Central extension 103 extends into chamber 90, and through bore 86, FIG. 3. A central bore 105 in the extension 103 provides flow communication, for example along the path of arrows 97 between the chamber 90 and an exterior of the assembly 50. Threads 106 in the central bore 105 provide for ready attachment to an extension, for example a threaded pipe extension, on a filter head assembly, in a conventional manner.

The cover, end plate or top plate 60 includes a plurality of apertures 108 extending therethrough which provide flow communication into the annular space 91. In the preferred embodiment shown, FIG. 2, the apertures 108 are positioned in a ring generally surrounding, but spaced from, the central bore 105. Such an arrangement is adapted for use with a filter head, 109, whereby inlet fluid flow can pass into the filter assembly 50 by means of the apertures 108, with outlet fluid flow being through bore 105. Again, an opposite flow arrangement may be utilized in some systems.

Also referring to FIG. 2, the apertures 108 provide flow communication into spaces 110 between fins 111. The radial fins 111 provide for relatively large spaces 110, to help spread fluid flow generally evenly around annular space 91.

By examination of FIG. 2, it will be understood that for the top plate 60 shown, two types of fins 111 are presented. These may be divided into a first set of fins 112 and second set of fins 113. For the embodiment shown in FIGS. 2 and 3, the fins alternate in type, with fins 113 differing from fins 112, at least in part, by being longer in extension.

Generally, the present invention primarily concerns three major features. The first is the general means by which the top plate 60 is received within the housing. The second the manner in which the top plate 60 engages the housing 55, to prevent relative rotation between the two. The third concerns method by which a seal may be provided to prevent undesired fluid flow, from between the top plate 60 and the housing sidewall 56, from being directed externally from an operative combination of a filter head, gasket and filter assembly.

Referring to FIG. 3, the housing 55 includes an annular inwardly ptojecting bead means or bead 120 therein. Generally, the bead 120 is a circumferential indentation in housing sidewall 56 at a selected position spaced from end 58. However, a discontinuous bead may be utilized in association with many of the principles of the invention. The portion of the housing sidewall 56 extending between the bead 120 and edge 58 is generally referred to herein as the cover lip or cover portion 125. The cover portion 125 wraps over the top plate 60, in a manner described in further detail below, to retain a selected top plate 60 within the assembly 50.

The outer peripheral portion 101 of the top plate 60 includes an annular lip 126 thereon which is positioned and sized in diameter appropriately to be capable of a seating engagement with the bead 120. Thus, after the bead 120 has been formed in the housing sidewall 56, the top plate 60 may be inserted, to seat against the bead 120. While for the embodiments described herein the lip, e.g. lip 126, directly contacts the bead, e.g. bead 120, such is not necessarily required. The bead may form a stop or shelf for the lip even if a portion of the assembly is positioned therebetween.

Referring again to FIGS. 2 and 3, fins 112 each include a lower, retracting, edge 130, which generally prevents engagement between fins 112 and the bead 120. On the other hand, radial fins 113 are not only slightly longer than fins 112 but they each include an outer edge 131 which is generally long enough to press into bead 120 during assembly. Thus, when the arrangement 50 is assembled, fins 113 will press into bead 120, causing outwardly extending dimples 132 therein. In this manner, fins 113 provide projections or projection means around which the housing sidewall 56 can wrap, FIG. 2, during assembly.

As a result of the arrangement described, as the assembly 50 is spun onto, or off of, a filter head 108, through grasping of the housing 55, a positive engagement between top plate projections, in this instance fins 113, and the housing sidewall 56 is ensured. That is, if the housing 56 is grasped and turned, the top plate 60 turns also.

Referring to FIG. 3, gasket means is depicted for providing sealing engagement between a filter assembly 50 and an associated filter head 109. The filter head 109 is only depicted in a fragmentary manner and may be of many types, including conventional ones. Mounting means for engagement between the filter assembly and the filter head may be of any of a variety of manners, ss will be understood by these of skill in this art. The gasket means of FIG. 3 comprises circular gasket 134. As the filter assembly 50 is spun onto a filter head, the gasket 134 is compressed between the assembly 50 and the filter head, preventing outward leakage of fluid positioned therebetween in the general direction of arrow 135. In particular, gasket 134 protects against outward leakage of fluid being directed to flow into apertures 108.

It is a feature of the present invention that a secure, fluid-tight seal is provided with respect to fluid flow from between the top plate 60 and housing 56 going outwardly from the system along the path of arrow 135. It is a particular feature that this seal may be secured by the same gasket 134 that provides the previously described sealing. A general characterization of this feature of the invention is that no positive seal for leakage from between the housing 56 and top plate 60 is provided. Rather, any flow leaking therefrom is directed to an area or volume defined by gasket 134 and is thus rendered generally harmless.

Another advantage to this arrangement is that the gasket is not inhibited from sliding movement with respect to the assembly 50 by projections or other structural features thereof.

The top plate 60 of FIG. 3, as described previously, includes gasket-receiving recess, recess portion, or area 102 therein. The gasket-receiving area 102 on top plate 60 is an annular groove 137 positioned in surface 100. Groove 137 forms an edge of the outer peripheral area 101 and is outside of the ring of apertures 108.

For assembly 50, the housing cover portion 125 is folded over the peripheral portion 101 and terminates in the groove 137. Thus, any fluid which may try to leak outwardly from between the top plate 60 and cover portion 125, as for example through flow from annular area 91, will be directed toward the gasket-receiving area or groove 137. Retention of the gasket 134 along edge 138 of the housing 55 is facilitated by an extension 139 of the gasket 134, which extends into the groove 137. Extension 139 forms a gasket-retaining extension for firmly mounting the gasket 134 on the assembly 50;

the groove 137 forming a gasket-retaining extension receiving groove. Thus, as the assembly 50 is mounted on a filter head 108, with gasket 134 therebetween, the gasket 134 is compressed into the groove 137 providing a fluid seal with respect to leakage from between the top plate 60 and the housing 55 directing fluid flow in the direction of arrow 135. In other words, in operation the gasket 134 generally circumscribes edge 138, preventing leakage fom the system or operative combination of the assembly 50, filter head 109 and gasket 134.

The arrangement previously described is advantageous over those conventional ones discussed for the prior art, for numerous reasons. For example, the arrangement provides for sealing by means of a relatively inexpensive, replaceble, potentially reusable, compressible, gasket 134, an often preferred form of seal. Further, should the top plate 60 be porous or even flawed in the area of its outer periphery 101, no substantial leakage from the assembly 50 in operation would result. That is, fluid would simply pass through the outer periphery 101 and be stopped by the cover portion 125; leakage from the system due to flow from between the cover portion 125 and the housing 56 being inhibited by the gasket 134.

Since an O-ring about an outer circumferential portion of the top plate 60 is avoided, advantages result. For example, it is not required that the housing 56 substantially completely resist bowing with respect to an inserted O-ring, since the engagement to gasket 134 will nevertheless be secure. Also, the top plate 60 need not necessarily be constructed from materials such as steel and the like, capable of spot welding, since an arrangement requiring spot welds is avoided. Also, a one gasket system is almost inherently preferable to a multiple gasket system, since it generally provides less points for leakage.

Numerous advantages result from the utilization of an annular bead such as bead 120, in the arrangement. For example, strengthening the upper portion of the housing sidewall 56 is facilitated by the bead 120. That is, compression forces of the bead 120 will generally limit flexibility of the housing sidewall 56 in the area of the top plate 60. Thus, when under strain from pulses of high pressure fluid, the housing 55 may be less likely to fatigue and cause leaks. Also, the bead 120 provides a conveniently located stop whereby the top plate 60 may be readily appropriately positioned at a desired depth within the housing 55, during assembly. The system also may provide for free movement, in a slidable, circular, manner of the gasket 134 with respect to the assembly 50, before a tightening against the filter head 109 during mounting. This offers numerous advantages including relatively easy mounting and removal without damage to the gasket 134 and without leaks.

The features of the present invention relating to overall engagement between a top plate and housing; and specifically to sealing therebetween, may be incorporated into a variety of assemblies utilizing a great many shapes of top plates. Examples of these are provided by FIGS. 4 through 8.

FIGS. 4 and 5 illustrate a first alternate embodiment of the instant invention. Assembly 150, of FIGS. 4 and 5, includes an outer casing 151, a top plate 152 and an inner filter 153. The filter 153 may be as described for the previous embodiment above, with an outer edge defined by a plurality of ribs such as rib 160, an inner sidewall 161, a central filter element 162, and a top sealing gasket 163. Other portions of the assembly 150, not shown in the fragmentary view of FIG. 5, may be essentially as illustrated in FIG. 3 for the previously described embodiment.

Analogously to housing 55 of FIG. 3, housing 151 includes a sidewall 164 with an annular bead 165, a cover portion 166 and an edge 167. The cover portion 166 of assembly 150 is substantially larger than the analogous portion for assembly 50, due to a difference in the manner in which portion 166 is folded, and the greater extension of distance over which it is folded, as will be apparent by comparison of the drawings. The top plate 152 includes an upper surface 170, an outer peripheral portion 171, an outer lip 172, a central bore 173 for communication with a filter head, not shown, and aperture means 174 providing flow communication with a filter head, not shown. A variety of flow arrangements is possible, however preferably fluid flow for assembly 150 involves the flow of unfiltered liquid into the system along the general path indicated by arrows 176, and thus into the housing 151 through apertures 174. Flow is then from annular space 177 across filter element 162 and into the central chamber 178. The now filtered fluid passes outwardly from the assembly 150 through central bore 173 in the top plate 152, along the path generally indicated by arrows 179.

The top plate 152, of assembly 150, is also provided wtth a gasket-receiving area 181 on the upper surface 170. The gasket-receiving area 181 includes an annular groove 182 formed in the top plate 152. The annular groove 182 includes a top edge 183, a recessing sidewall 184 and a bottom 185. Referring to FIG. 4, the top edge 183 includes a plurality of alternating projections 188 and recessed portions 189 therein. When arrangement 150 is assembled, the top plate 152 is positioned within the housing 151 such that the top plate outer lip 172 generally abuts or rests against bead 165. The housing cover portion 166 is folded over the outer peripheral area 171 of the top plate 152, and into groove 182. As the cover portion 166 is folded over edge 183, the alternating projections 188 and recesses 189 will provide for a secure engagement between the top plate 152 and the housing or casing 151. That is, the folding around the projections 188 and into the recessions 189 will generally inhibit relative rotational movement of the housing 151 and top plate 152, with respect to one another.

Further, referring to FIG. 5, preferably the cover portion 166 is folded to extend along and adjacent the recessing edge 184 and the bottom 185 of the groove 182. This results in advantages described below.

For the arrangement shown in FIGS. 4 and 5, sealing engagement with a filter head, not shown, may be provided by gasket means such as gasket 192 in a manner analogous to the arrangement shown in FIG. 3. The preferred gasket 192 is an annular ring positioned to seat within the groove 182, i.e. the gasket-receiving area. The gasket 192 is appropriately sized to abut against the portion of cover portion 166 which is formed into the groove recessing sidewall 184 and the bottom 185. In this manner, a secure seat or gasket-retaining means is provided for the gasket 192, i.e. longitudinal separation between the gasket 192 and the arrangement is inhibited. The gasket terminates externally of edge 167 of the cover portion 166, providing a fluid tight seal with respect to flow from between the housing 151 and the top plate 152 being directed outwardly from the assembly 150 in use, after the assembly 150 is tightened on a filter head or the like.

Advantages from this arrangement are similar to those presented by the previously described arrangement 50. For example, appropriate selection of the positioning of the bead 165 facilitates assembly. Interlocking of the top plate 152 and the housing 151 is accomplished, without the need for a pre-formation of indentations in the housihg 151. Thus, assembly 150 does not require a step of rotational alignment of the top plate 152 with respect to a housing having preformed indentations therein.

Also, fluid leakage is efficiently inhibited. That is, the problems previously described for conventional sealing systems have been generally avoided or reduced. No separate seal is needed to prevent leakage from between the housing 151 and cover plate 152, since any such leakage is retained from actual flow from the system by gasket 192, when the assembly 150 is mounted for use. Even should the other peripheral portion 171 of the top plate 152 be somewhat porous or flawed, leakage from the entire assembly 150 will not result, since the housing cover portion 166 will stop the leakage. A relatively thin wall may be used for the housing 151, since no O-ring type arrangement is required around an outer peripheral portion of the top plate 162 and, the upper portion 166 is not folded in a manner that is likely to eventually leak in an undesired manner, having become loose or open upon repeated pulsations, during typical usage of the arrangement 150. Further, the bead stiffens the housing in the area of the cover portion somewhat, resisting some undesired fatigue.

Referring to FIG. 4, the top plan view, certain internal details concerning the top plate 152 are shown. In particular, a plurality of annularly positioned apertures 174 are viewable between fins 195; the fins 195 being in part strengthened by means of a ring formation 196, FIG. 5, positioned centrally along an extension thereof. A lower shelf 197, FIG. 5, provides a stop for positioning the top plate 152 and also helps inhibit incoming fluid flow from reaching chamber 178, that is without first passing through the filter element 162.

While a top plate having the features of top plate 152 might be somewhat difficult to machine from a piece of metal, or be expensive to cast from metal, it may be readily formed from a synthetic material capable of being molded, such as the polymeric material or the like. Utilization of such materials is facilitated by the present invention, since no welding is involved in the sealing and since the housing 151 provides its own seal against even somewhat porous materials used for the top plate.

A second alternate embodiment of the invention is illustrated in FIGS. 6 and 7. In FIGS. 6 and 7 an assembly 200 is shown which also includes a housing 201, a top plate 202, and an internal filter 203. The filter 203 may be as illustrated in FIG. 3, with an outer edge defined by ribs 205, an inner sidewall 206, a filter element 207, and a top end enclosed by a gasket 208. Also analogously to the arrangement shown in FIG. 3, housing 201 includes a sidewall 210 with an annular bead 211 therein, defining a cover portion 212 with an edge 213.

The top plate 202, of the arrangement shown in FIGS. 6 and 7, includes an upper surface 215 and an outer peripheral portion 216 with a lip 217. A central bore 218, and a plurality of fins 219 defining annularly positioned spaces or apertures 220, provide flow directing means. Portions of the assembly 200 not shown in the fragmentary view of FIG. 7, may be generally analogous to those illustrated in FIG. 3.

Although alternate arrangements are possible, generally a preferred utilization of assembly 200 is through flow of unfiltered fluid therein by passage through apertures 220 along path 221, and into annular space 222. The fluid may be filtered by passage across filter element 207 and flow into central bore 225. The filtered fluid is then removed from the assembly 200 by outward flow along the general direction of path 226, i.e. through bore 218.

Referring to FIG. 7, the gasket-receiving area or means 229 in the top plate upper surface 215 is not a groove, as it was with the previously described embodiment. Rather, it comprises a substantially flat annular ring 230, forming a shelf in the outer peripheral portion 216 of the top plate 202. It is over and across this shelf or ring 230 that the housing cover portion 212 folds, to provide the preferred engagement therebetween.

Generally, the top plate 202 is seated within the assembly 200 by having lip 217, of outer periphery 216 generally rest against and abut bead 211. The cover portion 212 folds over ring 230, generally trapping the top plate 202 against the bead 211. For the embodiment of FIGS. 6 and 7, a pinch-fold 232 is formed in cover portion 212. The pinch-fold 232 generally extends, circumferentially, around ring 230, and extends upwardly therefrom. The pinch-fold 232 forms seat 233 for gasket-retaining means against which gasket means such as gasket 234, used to provide sealing engagement with a filter head, not shown, may abut. As with previously described embodiments, gasket 234 may provide sealing between the assembly 200 and the filter head, which prevents leakage from between the housing 201 and the top plate 202 from getting out from the interior of the gasket 234 when the assembly 200 is mounted on a filter head.

Referring to FIG. 6, the top plate 202 includes some radial fins 236 which are somewhat longer than the rest of the fins 219, and extend generally to near an outer edge of lip 217. As the top of plate 202 is pressed against bead 211, ends of the longer fins 236 will generally press into bead 211, engaging same. Thus, in the area of fins 236 a dimple or fold 240 in the bead 211 will result. This engagement generates retaining means inhibiting rotational movement of the housing 201 with respect to top plate 202, that is independently thereof. Thus, as with the previously described embodiments secure rotational engagement between the top plate 202 and the housing 201 is achieved without a need for a pre-formation of indentations in the housing 201. Adavantages resulting from this are as previously described.

Referring to FIG. 7, each aperture includes a slanted bottom wall 241 therein. The bottom walls 241 generally act to direct fluid flow toward annular space 222.

Yet another embodiment of the instant invention is illustrated in FIG. 8. FIG. 8 is a fragmentary cross-sectional view taken of an assembly 250 from a point of view generally analogous to that used for FIGS. 3, 5 and 7. Assembly 250 includes a housing 251, a top plate 252 and an internal filter 253. The internal filter 253 includes an outer edge defined by ribs such as rib 254, an inner wall 255, a central filter element 256 and a gasket 257. The housing 251 includes a sidewall 260 having an annular bead 261 an a cover portion 262 with an edge 263.

The top plate 252 includes an upper surface 265, an outer periphery 266 and a lip 267. Further, the top plate 252 includes a gasket-receiving area 269 with a groove 270 positioned inside an inner perimeter thereof. Aperture 271 permits fluid flow into the assembly along the general path indicated by arrows 272. Although not specifically shown, it will be understood that analogously to previously described embodiments, the embodiment of FIG. 8 includes a plurality of apertures 271 spaced along an annular ring. The top plate 252 also includes a central bore 275. Generally, operation of assembly 250 is as previously described for other arrangements, wherein unfiltered fluid flows inwardly along the path indicated by arrows 272, to annular space 280. The fluid is then filtered by passage across filter element 256 and into internal chamber 281. Filtered fluid may then flow outwardly from the assembly along the general path indicated by arrow 282. Again, alternate flow direction schemes may be possible, in accordance with the principles of the instant invention.

As with previously described embodiments, during assembly of the arrangement indicated generally by 250, the cover portion 262 is folded over the top plate upper surface 265, with edge 263 terminating at the gasket-receiving area 269 and inside of a location whereat an associated gasket would be positioned. More particularly, edge 263 terminates in groove 270. By this arrangement a single gasket 285 may be used as a fluid seal with a filter head, not shown, to prevent undesired fluid leakage outwardly from the system as a result of flow from between the top plate 252 and the housing 251.

Means are provided to retain gasket 285 in position. The means comprises an annular bracket 286 which is mounted to, and extends upwardly from, cover portion 262. Bracket 286 may be a folded piece of metal or the like, welded or otherwise attached to the housing 251 by conventional means. Bracket 286 provides a seat 287 against which a selected gasket 285 may rest.

Top plate 252 includes an inner shelf 290 therein, inhibiting fluid from flowing directly into internal chamber 281, that is without passage across filter element 256. Further, top plate 252 may include a plurality of fins such as fin 291 therein, directing fluid flow radially outwardly toward annular space 280, analogously to previously described embodiments. Positive engagement between the housing 251 and the top plate 252 may be provided by a variety of means. For example, as shown certain of the fins 292 may be long enough to form dimples such as dimple 293 in bead 261, as previously described for the embodiments shown in FIGS. 3 and 7. In the alternative, a plurality of projections may have been formed around groove 270, similarly to the arrangement shown in FIG. 5. It will be understood that either of these means may be readily incorporated, and may provide inhibition to rotation of the housing 251 independently of the top plate 252.

From the above descriptions, it will be understood that a wide variety of designs of top plates may be utilized in association with the principles of the instant invention. For example, the cover plate or top plate surface against which the housing cover portion abuts, after folding, may be relatively wide or relatively narrow. The gasket-receiving area may include a groove therein, although one is not necessary in some forms. Seating for an associated gasket positioned between the assembly and a filter head arrangement may be provided in a number of ways including: by means of a groove in the top plate, and into which the housing cover portion folds; by a bracket, FIG. 8; or by a pinch-fold, FIG. 7. Positive retention between the top plate and the housing, without pre-formed indentations in the housing, may be provided by projections at a variety of locations in the top plate. Although flow schemes have been shown for unfiltered fluid to the outer annular space, and filtered fluid from the internal chamber, alternate arrangements are possible. The top plates may be formed from a variety of materials including metal such as steel, cast aluminum or molded synthetic materials.

As previously indicated, an advantage to the instant invention is that it facilitates assembly of the overall filter unit. One reason for this, is that there is no need to pre-form indentations in the housing. Further, no outer peripheral O-ring, such as that described for one conventional arrangement, is needed. Also relatively thin metal may be used with advantages inherent therein achieved. For example, in a system having a preferred operating range of up to about 125 pounds per square inch (PSI), and a surge or boost pressure of about 206 PSI, drawn, corrosion-coated, steel used for the housing may have a thickness of between about 0.017 and about 0.028 inches, although other thicknesses are possible. Further, relatively high static pressures may be withstood, due to the hydrostatic design of the housing in the cover portion. For example, pressures of 880 PSI have been withstood by an arrangement according to the invention and using a housing only 0.025 inches thick.

Another advantage results from the fact that no complicated fold (49) such as that used in U.S. Pat. No. 4,369,113 is required. Thus, expense may be lessened, and a potential leak path is eliminated.

FIGS. 9 and 10 generally indicate assembly of an arrangement such as that illustrated in FIG. 3. In FIG. 9, assembly 300 is shown partially assembled, with the housing 301 prepared to receive a top plate 302 and filter 303 therein. For assembly according to FIGS. 9 and 10, filter 303 has been attached to central annular extension 304 of the top plate 302, prior to the top plate 302 being inserted in the housing 301. It will be understood that, in the alternative, the filter 303 may be dropped into the housing 301, before the top plate 302 is inserted.

The housing 301 is shown having had a bead 310 formed therein prior to insertion of top plate 302, although the bead may be formed after insertion of the top plate in some applications of the invention. A cover portion 311 of the housing 301 is shown not folded, so that an upper open lip 312 is formed around edge 313, to receive the top plate 302. Generally, the bead 310 will be formed at whatever depth leaves an appropriate cover portion 311 for the selected top plate 302.

FIG. 10 illustrates assembly 300 after the top plate 302 has been inserted substantially completely therein. The top plate 302 is inserted until an annular lip 314 thereof abuts or is generally positioned against bead 310. At this point, final assembly is accomplished by folding cover portion 311 over an outer peripheral portion 315 of the top plate 302. The result is an assembly such as that shown in FIG. 3.

Generally, steps of assembly will be analogous regardless of the particular embodiment chosen. However, for some embodiments positive engagement between the top plate and the housing will be accomplished by pressing dimples into the bead. In others, positive engagement will be generated during folding, by folding a portion of the cover portion against and around projections positioned in, for example, the top plate upper surface.

It is readily seen that bead 310 forms a guide to proper positioning of the top plate 302 and filter 303. That is, during assembly the bead 310 may be appropriately positioned to form a cover portion 311 of sufficient length to extend a desired amount across an upper surface in a selected top plate. Further, bead 310 may be appropriately positioned to allow for the top plate 302 to insert the filter 303 in appropriate, desired depth.

Also, according to the present invention an operative combination of a filter assembly, filter head and gasket is provided. The filter assembly is generally as previously described, with a housing and top plate; the housing having bead means and a cover portion, the top plate having a gasket-receiving area. The filter assembly is generally arranged with an edge of the cover portion terminating along or inside of the area circumscribed by the gasket. The operative combination involves mounting the filter assembly on the filter head, with the gasket positioned therebetween; the gasket being generally received in the gasket-receiving area. By this arrangement, as shown in FIG. 3, any fluid flow outwardly from between the housing and the top plate is generally directed inside of the gasket. The gasket provides a seal against pressure loss to the environment.

In FIGS. 11 and 12, a useful modification to the embodiment of FIGS. 2 and 3 is shown. The arrangement of FIG. 11 may be identical to that of FIGS. 2 and 3 except as follows.

In FIGS. 11 and 12, the peripheral portion 35 of the top plate 351 is shown with a plurality of concentrically aligned grooves 352 therein. Each groove 352 extends in an annular pattern around the top plate 351. When assembled into a filter assembly, such as assembly 355, the grooves 352 provide corrugation-forming means across which the housing cover portion 356 may fold. As the cover portion 356 is folded over, or spun over, the grooves 352, corrugations 357 form therein. Such an engagement helps prevent relative movement between the top plate 351 and the housing 358 during operation. The corrugations 357 also help strengthen the cover portion 356 and reduce tendency for radial cracks to develop during severe pressure fluctuations. Further, they help prevent imperfections from forming in the cover portion 356 during folding.

It will be understood that the corrugation-forming means may comprise one or more such grooves. Further, the corrugation-forming means, i.e. grooves, may be used in assocation with a variety of arrangements according to the invention, including the embodiments of any of FIGS. 3–8. The grooves may be of a variety of cross-sectional shapes and depth, and may be spaced apart a variety of distances. The corrugation-forming means may be provided by features other than grooves, for example annular ridges, not shown.

It is to be understood that while certain embodiments of the present invention have been illustrated and described, the invention is not to be limited to the specific forms or arrangment of parts herein described as shown.

What is claimed is:

1. An improved filter arrangement having an outer housing and an inner filter assembly with a top plate; the improvement including wherein:
    (a) said outer housing has a unitary construction and includes an inner seating bead, a cover portion and an edge;
    (b) said top plate includes an outer periphery and a top surface with a gasket-receiving recess portion;
        (i) said top plate outer periphery engaging said seating bead to substantially retain said top plate in position;
        (ii) said cover portion extending along said top plate top surface to partially cover same and enclose a portion of said top plate within said outer housing; said outer housing edge terminating within said top plate gasket-receiving recess portion; and,
    (c) gasket retaining means positioned on said housing cover portion; said gasket-retaining means being constructed and arranged to permit selected relative rotational movement between said filter arrangement and a gasket means mounted in association therewith, and to inhibit longitudinal separation therebetween; said gasket-retaining means comprising an annular pinch fold, having a gasket-receiving recessed wall, in said cover portion;
    (d) whereby a fluid seal during utilization of said filter arrangement with an associated filter head is provided by positioning gasket means in association with said top plate gasket-receiving recess portion and generally circumscribing said outer housing edge.

2. An improved filter arrangement having an outer housing and an inner filter assembly with a top plate; the improvement including wherein:
    (a) said outer housing has a unitary construction and includes an inner seating bead, a cover portion and an edge;
    (b) said top plate includes an outer periphery and a top surface with a gasket-receiving recess portion;
        (i) said top plate outer periphery engaging said seating bead to substantially retain said top plate in position;
        (ii) said cover portion extending along said top plate top surface to partially cover same and enclose a portion of said top plate within said outer housing; said outer housing edge terminating within said top plate gasket-receiving recess portion; and,
    (c) said top plate outer periphery including annular corrugation-forming means therein;
    (d) whereby a fluid seal during utilization of said filter arrangement with an associated filter head is provided by positioning gasket means in association with said top plate gasket-receiving recess portion and generally circumscribing said outer housing edge; and,
    (e) whereby said cover portion forms a corrugated structure when folded over said top plate outer periphery; said corrugated structure including annular corrugations.

3. The improved filter arrangement according to claim 2 wherein:
    (a) said corrugation-forming means comprises a plurality of spaced annular corrugation-forming grooves in said top plate outer periphery.

4. The improved filter arrangement according to claim 3 including:
    (a) three annular corrugation-forming grooves.

5. In operative combination a filter assembly, a filter head and a gasket; wherein:
    (a) said filter assembly includes an outer housing and an inner filter assembly with a top plate;
        (i) said outer housing being substantially unitary and having a closed end and an open end including an inner seating bend, a cover portion and an edge;

(ii) said top plate including an outer periphery and a top surface with a gasket-receiving recess; said top plate outer periphery engaging said seating bead to substantially retain said top plate in position; and, said cover portion extending along said top plate top surface to partially cover same and enclose a portion of said top plate within said outer housing; said outer housing edge terminating generally within said top plate gasket-receiving recess;

(b) said filter assembly includes means for mounting on said filter head;

(c) said filter assembly is operatively mounted on said filter head with said gasket therebetween;
  (i) said gasket being positioned at least partially within said gasket-receiving recess to generally circumscribe said housing member edge; and, (d) said filter assembly includes gasket-retaining means positioned on said housing cover portion; said gasket-retaining means being constructed and arranged to facilitate relative rotational movement between said gasket and said filter arrangement while simultaneously inhibiting longitudinal separation therebetween;
  (i) said gasket-receiving means including a pinch fold in said housing cover portion; and,
  (ii) said gasket including a lateral extension thereon constructed and arranged for receipt underneath a portion of said pinch fold.

6. In operative combination a filter assembly, a filter head and a gasket; wherein:

(a) said filter assembly includes an outer housing and an inner filter assembly with a top plate;
  (i) said outer housing being substantially unitary and having a closed end and an open end including an inner seating bead, a cover portion and an edge;
  (ii) said top plate including an outer periphery and a top surface with a gasket-receiving recess; said top plate outer periphery engaging said seating bead to substantially retain said top plate in position; and, said cover portion extending along said top plate top surface to partially cover same and enclose a portion of said top plate within said outer housing; said outer housing edge terminating generally within said top plate gasket-receiving recess;

(b) said filter assembly includes means for mounting on said filter head;

(c) said filter assembly is operatively mounted on said filter head with said gasket therebetween;
  (i) said gasket being positioned at least partially within said gasket-receiving recess to generally circumscribe said housing member edge; and, (d) said filter assembly includes gasket-retaining means positioned on said housing cover portion; said gasket-retaining means being constructed and arranged to facilitate relative rotational movement between said gasket and said filter arrangement while simultaneously inhibiting longitudinal separation therebetween;
  (i) said gasket-retaining means including a bracket mounted on said housing cover portion; and
  (ii) said gasket includes a lateral extension thereon constructed and arranged for receipt underneath a portion of said housing bracket.

7. An improved filter arrangement having an outer housing and an inner filter assembly with a top plate; the improvement including wherein:

(a) said outer housing has a unitary construction and includes an inner seating bead, a cover portion and an edge;

(b) said top plate includes an outer periphery and a top surface with a recess groove therein;
  (i) said top plate outer periphery engaging said seating bead to substantially retain said top plate in position;
  (ii) said cover portion extending along and adjacent said top plate top surface to partially cover same and enclose a portion of said top plate within said outer housing; said outer housing edge terminating within said top plate top surface recess groove;
  (iii) said top plate outer periphery including annular corrugation-forming means therein;

(c) said filter assembly includes a gasket-retaining arrangement positioned on said housing cover portion; said gasket-retaining arrangement being constructed and arranged to permit selected relative rotational movement between said filter arrangement and a gasket means mounted in association therewith, and to inhibit longitudinal separation therebetween;

(d) whereby a fluid seal during utilization of said filter arrangement with an associated filter head is provided by positioning gasket means in association with said gasket-retaining arrangement and generally circumscribing said outer housing edge;

(e) whereby said cover portion forms a corrugated structure when folded over said top plate outer periphery; said corrugated structure including annular corrugations.

8. The arrangement according to claim 7 wherein said top plate includes outwardly projecting radial fins thereon; said housing engaging said radial projections to provide a substantially non-slipping engagement between said top plate and said housing.

* * * * *

UNITED STATES PATENT AND TRADEMARK OFFICE
CERTIFICATE OF CORRECTION

PATENT NO. : 4,834,885

DATED : May 30, 1989

INVENTOR(S) : Kenneth G. Misgen, Gary R. Gillingham, Gary J. Rocklitz, Reynold F. Durre It is certified that error appears in the above-identified patent and that said Letters Patent is hereby corrected as shown below:

TITLE PAGE:

Listed under References Cited, FOREIGN PATENT DOCUMENTS, in the second line, PCT International Application No. 82/01580 dated 5/1983 should be changed to read "83/01580".

Signed and Sealed this

Eleventh Day of February, 1992

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,834,885

DATED : May 30, 1989

INVENTOR(S) : Misgen et al.

It is certified that error appears in the above-identified patent and that said Letters Patent is hereby corrected as shown below:

Column 19, line 1, delete "bend" and insert therefor --bead--

Signed and Sealed this

Third Day of September, 1996

Attest:

BRUCE LEHMAN

*Attesting Officer*         *Commissioner of Patents and Trademarks*